United States Patent [19]

Newton et al.

[11] Patent Number: 5,758,929
[45] Date of Patent: Jun. 2, 1998

[54] VARIABLE CAPACITY ELECTROPNEUMATIC CONTROL VALVE

[75] Inventors: Ronald O. Newton, Adams; Kevin B. Root, Black River, both of N.Y.

[73] Assignee: New York Air Brake Corporation, Watertown, N.Y.

[21] Appl. No.: 712,199

[22] Filed: Sep. 11, 1996

[51] Int. Cl.[6] .................................................... B60T 13/68
[52] U.S. Cl. ........................................ 303/3; 303/28
[58] Field of Search ............................ 303/3,15, 22, 28

[56] References Cited

U.S. PATENT DOCUMENTS

| | | |
|---|---|---|
| 3,944,287 | 3/1976 | Nagase ................................ 303/3 |
| 4,253,480 | 3/1981 | Kessel et al. . |
| 4,553,723 | 11/1985 | Nichols et al. . |
| 4,598,953 | 7/1986 | Wood et al. ........................ 303/3 |
| 4,744,607 | 5/1988 | Nagata ............................... 303/3 |
| 4,869,557 | 9/1989 | Gerum et al. ...................... 303/3 |
| 5,090,780 | 2/1992 | Powell . |
| 5,192,118 | 3/1993 | Balukin et al. . |
| 5,294,190 | 3/1994 | Feldman et al. ................... 303/3 |
| 5,412,572 | 5/1995 | Root et al. ......................... 303/3 |

*Primary Examiner*—Matthew C. Graham
*Attorney, Agent, or Firm*—Barnes & Thornburg

[57] ABSTRACT

A variable capacity electropneumatic control valve using analog electropneumatic supply and release valve to control the control valve output and a relay valves to add extra capacity when the required capacity exceeds that of the analog valves.

22 Claims, 2 Drawing Sheets

VARIABLE CAPACITY ELECTROPNEUMATIC CONTROL VALVE

BACKGROUND AND SUMMARY OF THE INVENTION

The present invention relates generally to variable capacity electropneumatic valves and more specifically to a variable capacity electropneumatic valve for use in pneumatic brake systems.

In vehicle air brake systems, certain portions need to increase capacity compared to the standard valve capacity. This increased capacity may be the total amplitude of the pressure signal or the rate of buildup. An electropneumatic brake system of prior art, illustrated in FIG. 1, includes electropneumatic supply SUPP and release REL valves having a common output connected as the control input to a relay valve R. A source of air, for example, from a main reservoir MR is connected via filter F1, as an input to the supply valve SUPP and the relay valve R. A stabilization chamber SC is provided at the output of the supply SUPP and release REL valves. A transducer T1 measures the pressure out of the relay valve R. The relay valve is a three positioned valve having a center lap position between a pressure applied position and an exhaust position. The feedback from the output of the relay valve cooperates with the spring to move the relay valve R to the lap position when the output plus the spring matches the desired pressure in the stabilization chamber SC. The relay valve R is used since it has increased capacity compared to the supply and release valve SUPP and REL. The requirement for the high capacity relays discussed in U.S. Pat. No. 5,192,118 for the independent application and release pipe of a freight brake system.

Another well-known technique of the prior art, as illustrated in FIG. 2, is to use two supply rate valves SUPP, one of a higher and one of a lower capacity or flow rate. With the use of the two supply valves, the relay valve is not needed. Alternatively, a relay valve may be used. As shown in FIG. 6 of U.S. Pat. No. 4,553,723, the standard pair of supply and release valves SUPP and REL may be used with a fast rate and slow rate magnetic valves connected in parallel between the output of the combined supply and release valves SUPP and REL and the output of the valve structure. This is used to control the equalization reservoir which controls the freight train brake pipe. U.S. Pat. No. 5,090,780 shows a similar parallel flow rate valve for the brake cylinder of a train.

The electropneumatic supply and release valves have historically been digital valves operating in an open or closed position. The maximum capacity is generally an equivalent orifice capacity of approximately one-quarter of an inch. While digital control valves themselves have sufficient capacity to operate, for example, independent application and release pipe for two locomotives, they do not have the capacity to operate for up to ten locomotives as required by the American Association of Railroads. The use of a relay valve R, as illustrated in FIG. 1, increases the capacity of the output to an equivalent orifice capacity of approximately ½ inch. While the addition of a relay increases the capacity of the system, a relay has hysteresis which deteriorates the accuracy and control of the pressure and response at the output. Similarly, digital control of the supply and release valves also have limited accuracy.

The use of analog supply and release valves substantially increases the accuracy of the control and the response of the system. Analog valves have even have smaller capacity than digital supply and release valves having a maximum capacity of an equivalent orifice capacity of approximately ⅛ of an inch. This results in the use of the relay valves to increase the capacity at the cost of diminishing the control and accuracy and the response of the signal produced by the analog valves.

Thus, it is an object of the present invention to provide an electropneumatic control valve of increased capacity and accuracy.

Another object of the present invention is to provide an electropneumatic control valve of increased capacity and accuracy for use in rail brake systems.

These and other objects are achieved by providing a variable capacity electropneumatic control valve including analog electropneumatic valves for providing signals at its output which are connected directly to the output of the control valve as well as the control signal to a relay valve. The path connecting the output of the analog valve to the control valve output has a third capacity slightly less than a first capacity of the analog valve output and significantly less than a second capacity of the relay valve output. The system operates such that the relay valve adds capacity to the control valve output when the capacity required exceeds the third capacity. This minimizes the inaccuracies introduced by the relay valve while adding capacity when required. An electrical controller is provided for sensing the output of the control valve and providing control of the analog valves as the function of the desired output and the sensed output.

The relay valve is biased to its lap position for an analog output below the third capacity. A pair of electropneumatic cut-off valves are provided, one at the output of the control valve and other at the output of the analog valves. The pair of electropneumatic cut-off valves include a common electropneumatic first valve pneumatically controlling separate pneumatic second valves. A stabilization chamber is connected to the analog valves' output. The controller controls the magnitude and rate of the pressure at the control valve output.

The variable capacity electropneumatic valve is designed for use in a pneumatic brake system of a rail vehicle with control pipes, reservoirs, etc. and preferably the independent application and release pipe. The electropneumatic cut-off valves are responsive to the lead or trail mode of the car in which the control valve is included.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
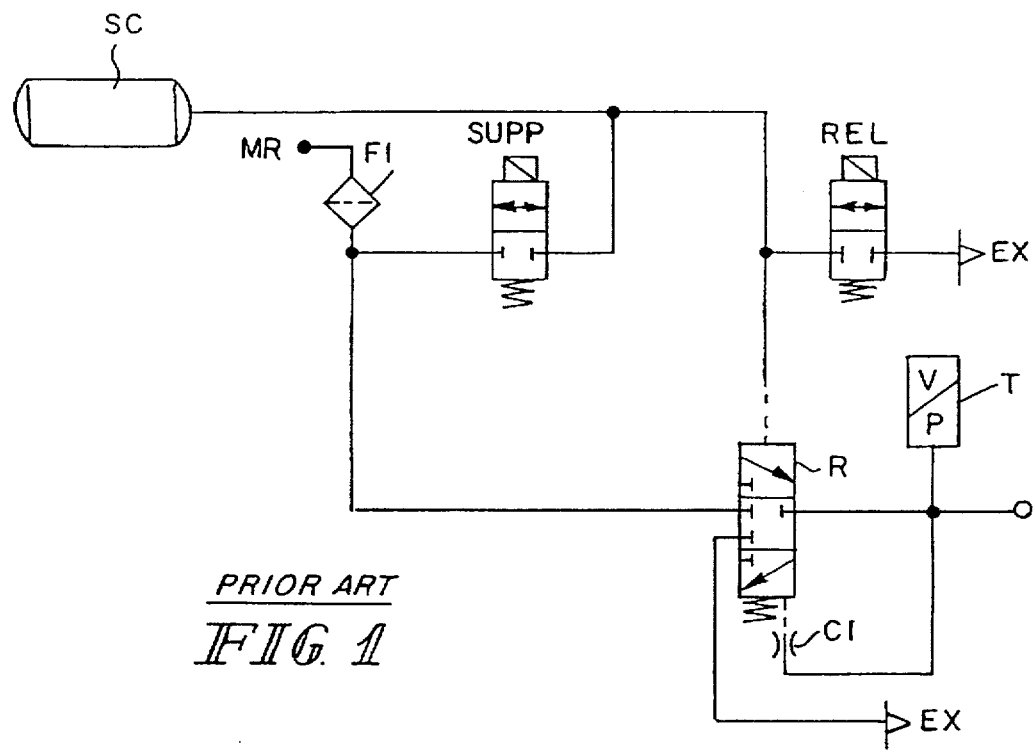
FIG. 1 is a increased capacity control valve of the prior art including a relay valve.
Figure 2:
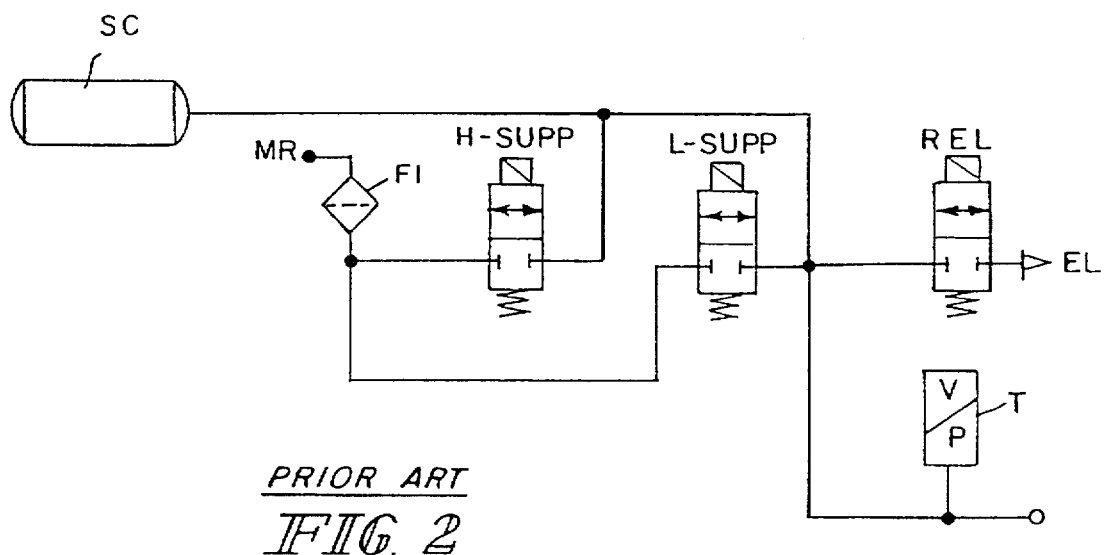
FIG. 2 is a variable capacity control valve of the prior art without a relay valve.
Figure 3:
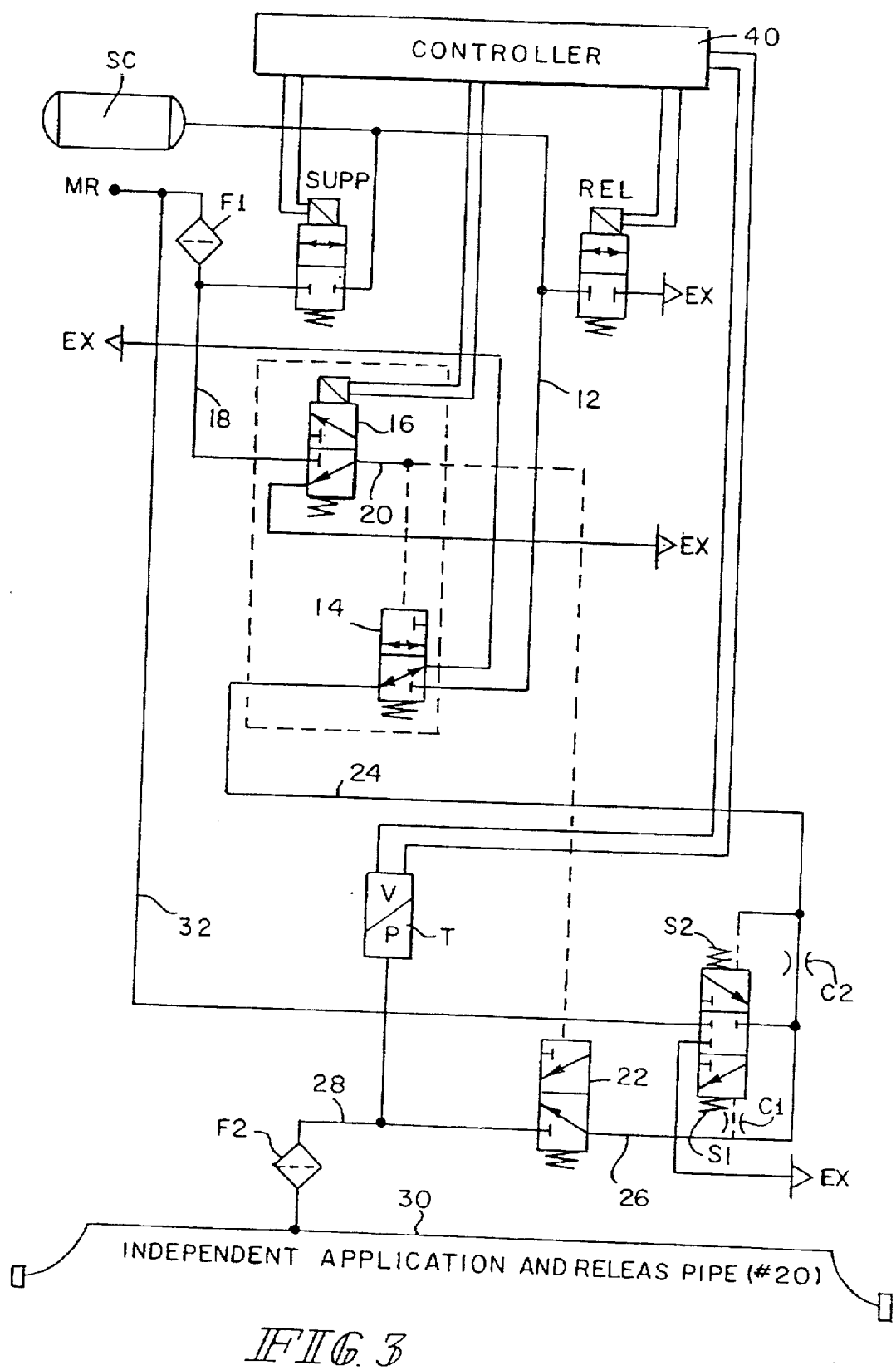
FIG. 3 is a variable capacity control valve incorporated in the principles of the present invention.

A variable capacity electropneumatic control valve as part of a freight brake system is illustrated in FIG. 3. An electropneumatic supply valve SUPP and an electropneumatic release valve REL have their outputs connected in common to a stabilization chamber SC. The input of the release valve REL is the exhaust EX and the input of the supply valve SUPP is from a source of pressure, for example, a main reservoir MR through filter F1. The common output of the supply and release valves are connected via passage 12 to a pneumatic cut-off valve 14 as one of its inputs. The other input to the pneumatic cut-off valve 14 is the exhaust port EX. Electropneumatic cut-off control valve 16, having an input 18 from the main reservoir MR, provides its output 20 as its control input to cut-off valve 14 and cut-off valve 22.

The output of cut-off valve 14 is connected via passage 24 as a control input and with a spring S2 to relay valve R. Passage 24 is also connected via restriction C2 to the output of the relay valve and R. The combined output of restriction C2 and relay valve R are provided via passage 26 as an input to the cut-off valve 22. The output of cut-off valve 22 is connected via passage 28 and filter F2 to control pipe 30, illustrated as independent application and release pipe. A pressure to voltage transducer T is connected to passage 28.

The inputs for the relay R includes a supply pressure from the main reservoir MR via passage 32 and exhaust EX. A restriction C1 connects the output of the relay valve as a feedback control signal and with a spring S1 operates against the control signal received on passage 24 from the stabilization chamber SC and spring S2. Controller 40 is connected to the electropneumatic supply valve SUPP, electropneumatic relay valve REL and the electropneumatic cut-off control valve 16. It is also connected to the pressure voltage transducer T. The springs S1 and S2 on both the input and output sides provide bias to lap for the relay.

The controller 40 controls the electropneumatic shut-off valve 16 depending upon the lead or trail mode of the car in which the control valve of FIG. 3 is included. If this car is the leading car, controller 40 activates cut-off control valve 16 from the inactive position illustrated in FIG. 3 to connect its input on line 18 to its output on passage 20 providing control pressure to cut-off valves 14 and 22. This moves the cut-off valves 14 and 22 to their second position from the position shown. Valve 14 connects the output of the stabilization chamber and the supply and release valves on passage 12 to passage 24 as a control input to the relay R, and to the output of the control relay via choke C2. Cut-off valve 22, in its second position, connects the output of the relay R and line 24 via passage 26 to its output passage 28 and onto the control pipe 30. This allows control of the control pipe 30 by the control valve in FIG. 3.

In the trailing mode, the controller 40 does not activates the cut-off control valve 16 and it remains in the position illustrated. This disconnects its pressure input from passage 18 from its output on passage 20 and connects its output passage 20 to exhaust EX. This deactivates the pneumatic cut-off valves 14 and 22 and they are spring biased to a position illustrated. Cut-off valve 14 disconnects passage 12 connected to the stabilization chamber SC and the electropneumatic supply and release valve from passage 24 and the relay valve R. Cut-off valve 22, in its deenergized position, also cuts off passage 26, which is the output of the relay valve R and the continuation of passage 24 from the stabilization chamber SC and the electropneumatic supply and release valves from line 28, from the control pipe 30. Thus, the control valve system of FIG. 3 would not operate the control pipe 30, only the control valve in the lead mode can control the control pipe 30.

The controller 40 and the electropneumatic supply and release valves SUPP and REL are connected and operate as an analog electropneumatic valve. By using a variable frequency signal which exceeds the maximum actuating frequency of the supply and release valves, an accurate analog pressure output can be provided which varies not only in magnitude, but in rate of change. Such a valve is known as the AW4 available from New York Air Brake Corporation and is described in U.S. Pat. No. 4,253,480. As previously discussed, the output of the analog valve has an orifice of a first capacity, for example, approximately ⅛ of an inch. This output is provided via the cut-off valve 14 as a control input to the relay valve R. The output of the control relay R provided on passage 26 has a second capacity greater than the first capacity of the supply and the electropneumatic supply and release valves. The second capacity is of approximately a ½ inch orifice. The choke or restriction C2 in the flow path connected between the control connection of passage 24 from the supply and release valves and the stabilization chamber SC to the control input of the relay and the output of the relay valve R has a third capacity which is slightly less than the first capacity of the supply and release valves and significantly less than the second capacity of the output of the relay valve R. For example, the choke C2 would have a capacity of an opening of 7/64 of an inch.

The relay valve R, when operating a standard relay valve, includes a center lap position where the two inputs, one being from a pressurized source and other being exhaust EX are disconnected from its output. The lap position is achieved when the input on its control port is balanced against a spring bias, for example, S1, and its output feedback through choke C1. For any variation in its output or its control input, will cause the valve to move from lap to one of its two other positions. If the output, in combination with the spring S1, is less than the control input, then the valve will move, in FIG. 3, down to a second position connecting a pressure source at its input to its output. As the output plus the bias approaches the control pressure, the relay valve will return to the lap or center position. If the output plus the bias of S1 exceeds the control input, the relay valve, in FIG. 3, would move up to its third position connecting the output to exhaust and thereby reducing the output. When the output plus the bias S1 equals the control input, the relay valve returns to its lap or center position. When the input is completely removed, the relay valve is biased to move to the third position and the output is connected to exhaust.

For the present invention, the relay valve R is modified such that it is biased to its lap position illustrated in FIG. 3, when the output of the relay plus the bias is equal to input on line 24. This results from the addition of bias spring S2. Thus, the modified relay valve R would only assume its second or third position when the output demand exceeds the ability of the choke C2 to supply the demand. Thus, as will be discussed below, the relay valve R is only operable in adding extra capacity to increase or decrease pressure to the control pipe 30. The control of the electropneumatic supply and release valves SUPP and REL and stabilization chamber SC provides increase and decrease of pressure in the control pipe 30. This removes any hysteresis from this release function which would normally be produced by the relay valve R.

The controller 40 upon receipt of a desired change of the pressure for the control pipe 30 operates either the supply or the release valve to increase or decrease the pressure. For a decrease in pressure, the release valve REL is operated to reduce the pressure in the stabilization chamber SC and passages 12, 24. This consequently reduces the pressure in passages 26, 28 and control pipe 30. As previously discussed, the biasing of the relay valve R is not changed from its lap position shown when the pressure on the control input 24 is more than or equal to that in the passage 26 which is the feedback control of the relay valve R. The controller 40 monitors the pressure on the output of the control valve in passage 28 via transducer T and controls the release valve REL so as to turn it off once the desired pressure is reached at the output 28 and on control pipe 30. If the pressure in passage 26, 28 and control pipe 30 is greater than the pressure in control input 24, the relay valve R will move to the third position and aid in exhausting passages 26, 28 and control pipe 30.

In order to increase the pressure on control pipe 30, the controller 40 operates the supply valve SUPP to increase the pressure from the main reservoir to the stabilization chamber SC and passages 12, 24. This increases the pressure at the control input to relay valve R. As long as the demand is below the capacity of choke C2, the pressure at the input and the output of choke C2 will be the same and the feedback control pressure on the relay valve will be equal to that of the control pressure from passage 24. Thus, the relay valve will stay in its lap position.

If the required capacity in passage 24 exceeds that of choke C2, a pressure develops there across increasing the pressure in passage 24 and the control port to the relay valve R compared to that provided through choke C1 at the feedback from the output of the relay valve R. This causes the relay valve R to move down, in FIG. 3, to its second position connecting its pressurized input 32 to its output. Thus, the relay valve R adds its increased capacity to be combined with the capacity and flow from the stabilization chamber SC and the supply valve SUPP in passages 26, 28 through to the control pipe 30.

As the value of the control pipe 30 in line 28 approaches the desired value as sensed by transducer T, the controller 40 diminishes the operation of the supply relay SUPP and decreases the flow in passages 12 and 24. Once the capacity in passage 24 equals or is reduced below the capacity of C2, the pressure differential on the relay valve R is removed and it moves back to its lap position. This removes the relay capacity from passages 26 and 28 and again puts the capacity totally under the control of the supply valve SUPP and the stabilization chamber SC. Since the relay valve R is only operated in part of the total operational cycle, its hysteresis effects are minimized. For the above values, the relay valve R would not come into affect for changes of ±10 PSI change of the control pipe 30.

While the present system in FIG. 3 has been shown for use with the independent application and release pipe, it can be used to control any pipe or reservoir or any other system. Similarly, the control valve structure can be used without the cut-off mechanism including valves 16, 14 and 22. The control valve combines the accuracy of an analog operated electropneumatic valve with a capacity of a relay valve which is selectively used to add capacity when needed while minimizing the hysteresis effect of the relay valve in the overall system.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A variable capacity electropneumatic control valve having an electrical EP input and a pneumatic EP output comprising:

an analog electropneumatic valve having a pressure output of a first capacity selectively connected to either a pressure input or exhaust port in response to said electrical EP input;

a relay valve having a supply input, a control input, an output of a second capacity greater than said first capacity and a feedback input connected to the relay valve's output;

said analog valve's output being connect to said relay valve's control input;

a flow path having a third capacity less than said first and second capacities and connecting said relay valve's control input to said EP output; and said relay valve's output being connected to said EP output and operates to add capacity when required capacity exceeds said third capacity.

2. A valve according to claim 1, wherein said relay is biased to a lap position for an analog output below said third capacity.

3. A valve according to claim 2, including a controller for sensing the EP output and providing said EP input as a function of a desired output value and sensed EP output.

4. A valve according to claim 2, including an electropneumatic cutoff valve at said EP output.

5. A valve according to claim 4 including an electropneumatic cutoff valve at said analog valve's output.

6. A valve according to claim 1, including an stabilization chamber connected to the analog valve's output.

7. A valve according to claim 1, including a controller for sensing the EP output and providing said EP input as a function of a desired output value and sensed EP output.

8. A valve according to claim 7, including an electropneumatic cutoff valve at said EP output and controlled by said controller.

9. A valve according to claim 8 including an electropneumatic cutoff valve at said analog valve's output and controlled by said controller.

10. A valve according to claim 7, wherein said controller controls the magnitude and the rate of change of pressure at said EP output.

11. A valve according to claim 1, including an electropneumatic cutoff valve at said EP output.

12. A valve according to claim 11 including an electropneumatic cutoff valve at said analog valve's output.

13. A valve according to claim 12, wherein said electropneumatic cutoff valves include a common electropneumatic first valve pneumatically controlling separate pneumatic second valves.

14. An electropneumatic brake control system for a train including a control pipe extending through at least a portion of said train and an electropneumatic control valve having an electrical EP input and a pneumatic EP output for controlling pressure in said control pipe, said control valve comprising:

an analog electropneumatic valve having a pressure output of a first capacity selectively connected to either a pressure input or exhaust port in response to said electrical EP input;

a relay valve having a supply input, a control input, an output of a second capacity greater than said first capacity and a feedback input connected to the relay valve's output;

said analog valve's output being connect to said relay valve's control input;

a flow path having a third capacity less than said first and second capacities and connecting said relay valve's control input to said EP output; and said relay valve's output being connected to said EP output and operates to add capacity when required capacity exceeds said third capacity.

15. A system according to claim 14, wherein said relay is biased to a lap position for an analog output below said third capacity.

16. A system according to claim 14, including a controller for sensing the EP output and providing said EP input as a function of a desired output value and sensed EP output.

17. A system according to claim 16, including an electropneumatic cutoff valve at said EP output and controlled by said controller.

18. A system according to claim 17 including an electropneumatic cutoff valve at said analog valve's output and controlled by said controller.

19. A system according to claim 18, wherein said electropneumatic cutoff valves include a common electropneumatic first valve pneumatically controlling separate pneumatic second valves.

20. A system according to claim 18, including a controller to control said cutoff valves as a function of trail or lead mode of said control valve.

21. A system according to claim 16, wherein said controller controls the magnitude and the rate of change of pressure at said EP output.

22. A system according to claim 14, including an stabilization chamber connected to the analog valve's output.

* * * * *